(12) United States Patent
Isamikawa

(10) Patent No.: US 12,192,415 B2
(45) Date of Patent: Jan. 7, 2025

(54) COMPARING READ IMAGE DATA TO CORRECTIVE IMAGE DATA TO DETERMINE IF THE READ IMAGE DATA IS APPROPRIATE FOR IMAGE FORMATION

(71) Applicant: KONICA MINOLTA, INC., Tokyo (JP)

(72) Inventor: Junichi Isamikawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 3 days.

(21) Appl. No.: 17/545,599

(22) Filed: Dec. 8, 2021

(65) Prior Publication Data

US 2022/0191333 A1 Jun. 16, 2022

(30) Foreign Application Priority Data

Dec. 11, 2020 (JP) .................. 2020-205480

(51) Int. Cl.
   *H04N 1/00* (2006.01)
(52) U.S. Cl.
   CPC ..... *H04N 1/00005* (2013.01); *H04N 1/00029* (2013.01); *H04N 1/00074* (2013.01)
(58) Field of Classification Search
   None
   See application file for complete search history.

(56) References Cited

U.S. PATENT DOCUMENTS

| | | | |
|---|---|---|---|
| 9,007,658 B2 | 4/2015 | Ito | |
| 2008/0204819 A1* | 8/2008 | Chiba | H04N 1/3935 358/452 |
| 2012/0201549 A1* | 8/2012 | Sakata | G03G 15/6591 399/16 |
| 2014/0002842 A1 | 1/2014 | Ito | |
| 2019/0220970 A1* | 7/2019 | Mimura | G06T 7/001 |

FOREIGN PATENT DOCUMENTS

| | | |
|---|---|---|
| JP | 2014008610 A | 1/2014 |
| JP | 2019132966 A | 8/2019 |

OTHER PUBLICATIONS

Office Action (Notice of Reasons for Refusal) issued on May 14, 2024, by the Japanese Patent Office in corresponding Japanese Patent Application No. 2020-205480, and an English Translation of the Office Action. (8 pages).

* cited by examiner

*Primary Examiner* — Eric A. Rust

(74) *Attorney, Agent, or Firm* — Buchanan Ingersoll & Rooney PC

(57) ABSTRACT

Provided is an image control apparatus that includes a hardware processor. The hardware processor obtains read image data generated by reading an image formed on a sheet, sets read proof image data generated by reading a proof image formed on a sheet in a proof output as first correct image data, sets input image data as second correct image data, determines which one of the first correct image data and the second correct image data is used as correct image data in an image check for each page, and performs the image check by comparing the read image data obtained by the hardware processor with the first correct image data or the second correct image data determined as the correct image data by the hardware processor.

12 Claims, 6 Drawing Sheets

COMPARING READ IMAGE DATA TO CORRECTIVE IMAGE DATA TO DETERMINE IF THE READ IMAGE DATA IS APPROPRIATE FOR IMAGE FORMATION

CROSS-REFERENCE TO RELATED APPLICATIONS

The entire disclosure of Japanese Patent Application No. 2020-205480 filed on Dec. 11, 2020 is incorporated herein by reference in its entirety.

BACKGROUND

Technological Field

The present invention relates to an image control apparatus, an image formation apparatus, and a storage medium.

Description of the Related Art

A read image generated by reading an image formed on a sheet by an image reading device is compared with a correct image such as data of an image to be printed before image formation, and if the read image is not appropriate, the formed image is found defective. The printed sheet which is found defective is separately ejected through a path different from a normal ejection path as a waste sheet after through the image reading device. This function is known as an automatic check function.

For example, in JP2019132966A, a read image generated by reading a recording medium printed in a proof output and an image for printing in a job before image formation are compared with each other to perform an image check in which appropriateness of the image on the recording medium is determined. The read image data generated by reading the recording medium printed in an actual output and the read image generated by reading the recording medium printed in a proof output are compared with each other to perform an image check in which appropriateness of an image on the recording medium in the actual output is determined.

SUMMARY

Two methods of obtaining the correct image exist: setting a read image (Scan image) generated by reading the image reading device at the time of proof output as the correct image data; and setting an image for printing (RIP image) input from a print controller as the correct image data.

In setting the Scan image as the correct image data, an operation for checking beforehand whether a printed material at the time of proof output is appropriate is necessary. Therefore, it is possible to more efficiently perform an image check using the RIP image as the correct image data, but it is impossible to perform an image check using an RIP image when the RIP image does not exist in a print job without an input command from a print controller or when a blank sheet is inserted.

In a case where the sheet on which the image is formed is a sheet for additional printing or a colored sheet, it is impossible to perform an image check using the RIP image and it is necessary to perform an image check using the Scan image. In a case where the print job involves variable data printing having an area where different images are printed on different pages, it is necessary to perform an image check using the Scan image, and it is impossible to perform an efficient image check depending on the output settings.

The technique disclosed in JP2019132966A cannot solve the above-described problem.

An object of the present invention is to provide an image control apparatus, an image formation apparatus, and a storage medium that allow an efficient image check.

To achieve at least one of the abovementioned objects, an image control apparatus reflecting one aspect of the present invention includes:

a hardware processor,
wherein the hardware processor:
  obtains read image data generated by reading an image formed on a sheet;
  sets read proof image data generated by reading a proof image formed on a sheet in a proof output as first correct image data;
  sets input image data as second correct image data;
  determines which one of the first correct image data and the second correct image data is used as correct image data in an image check for each page; and
  performs the image check by comparing the read image data obtained by the hardware processor with the first correct image data or the second correct image data determined as the correct image data by the hardware processor.

To achieve at least one of the abovementioned objects, an image control apparatus reflecting another aspect of the present invention includes:

a hardware processor,
wherein the hardware processor:
  obtains read image data generated by reading an image formed on a sheet;
  sets read proof image data generated by reading a proof image formed on a sheet in a proof output as first correct image data;
  sets input image data as second correct image data; and
  performs an image check in variable data printing by comparing the read image data obtained by the hardware processor with the first correct image data in a first area of the read image data where different images are printed on different pages and by comparing the read image data obtained by the hardware processor with the second correct image data in a second area of the read image data outside the first area.

To achieve at least one of the abovementioned objects, an image formation apparatus reflecting another aspect of the present invention includes:

an image former that forms an image on a sheet;
an image reading device that reads an image formed on a sheet so as to generate read image data; and
the image control apparatus described above.

To achieve at least one of the abovementioned objects, a non-transitory storage medium reflecting another aspect of the present invention stores a computer-readable program that causes a computer of an image control apparatus to:

obtain read image data generated by reading an image formed on a sheet;
set read proof image data generated by reading a proof image formed on a sheet in a proof output as first correct image data;
set input image data as second correct image data;
determine which one of the first correct image data and the second correct image data is used as correct image data in an image check for each page; and perform the image check by comparing the read image data with the first correct image data or the second correct image data determined as the correct image data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF THE EMBODIMENTS

Hereinafter, one or more embodiments of the present invention are described with reference to the drawings. However, the scope of the invention is not limited to the disclosed embodiments.

[Configuration of Image Formation Apparatus]

Figure 1:
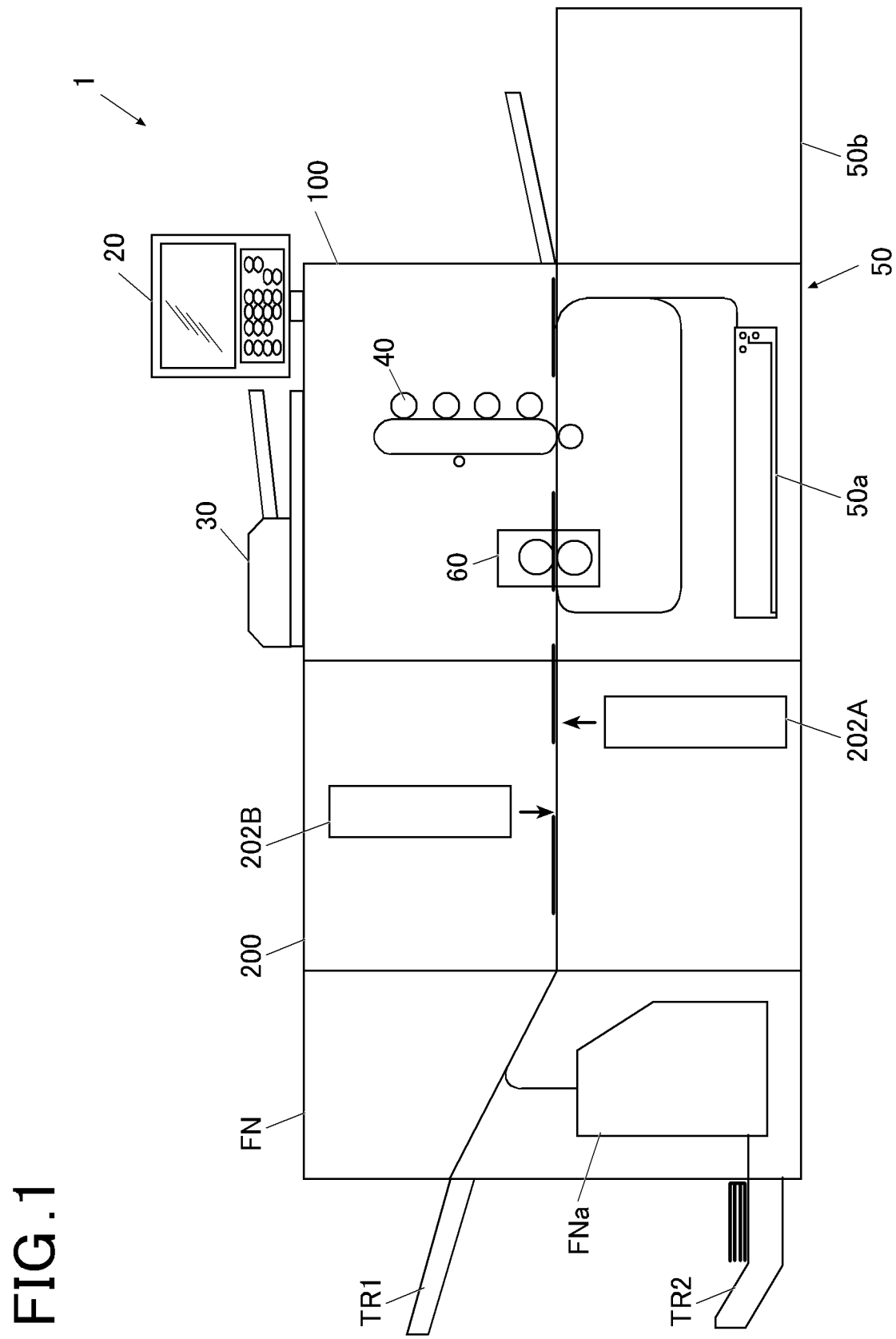
FIG. 1 shows a schematic configuration of an image formation apparatus in an embodiment of the present invention.

A device configuration of an embodiment of the present invention is described with reference to FIGS. 1 to 3. FIG. 1 shows a schematic configuration of an image formation apparatus 1 according to the embodiment of the present invention.

As shown in FIG. 1, the image formation apparatus 1, which forms an image on a sheet by an electrophotographic method, is a color image formation apparatus of a tandem type in which toners of four colors of yellow (Y), magenta (M), cyan (C), and black (K) are overlaid.

The image formation apparatus 1 includes an image formation apparatus main body 100, an image reading device 200, and a post-processing device FN connected to the image reading device 200 in series.

The image formation apparatus main body 100 performs image formation on a sheet. The image formation apparatus main body 100 includes an operation/display interface 20, a scanning unit 30, an image forming unit (image former) 40, a fixing unit 60, and a sheet feeding unit 50. The internal configuration of the image formation apparatus main body 100 is described later.

The image reading device 200 is a device that reads a sheet which is output from the image formation apparatus main body 100 and on which an image is formed. The image reading device 200 includes an image readers 202A and 202B. The image reader 202A, which is disposed downstream with respect to the image formation apparatus main body 100 on the conveyance path, reads an image on one face of the sheet (ex. back side) and obtains the read image data. The image reader 202B, which is disposed downstream with respect to the image reader 202A on the conveyance path of the sheet, reads an image on the opposite face of the sheet (ex. front side) and obtains the read image data. The image readers 202A and 202B are color sensors that receive light emitted from a light source and reflected on the front side of the sheet with a light receiving element and output signals according to the intensity of the light. The image readers 202A and 202B may be line sensors with light receiving elements disposed at predetermined intervals in the direction orthogonal to the sheet conveyance direction. The image readers 202A and 202B may read a predetermined area in the direction orthogonal to the sheet conveyance direction.

The post-processing device FN, which is a device executing a saddle stitching on a sheet output from the image reading device 200 as necessary, includes a saddle stitching unit FNa. Specifically, in a case where the saddle stitching execution is not set in a print job, the post-processing device FN directly ejects the sheet to the sheet ejection tray TR1 without executing the saddle stitching. The post processing device FN includes a sheet ejection tray TR3 (not shown in the drawings) for ejecting sheets separately from sheets ejected to the ejection tray TR1.

On contrary, in a case where the saddle stitching process execution is set in a print job, the post-processing device FN executes the saddle stitching process ejects the saddle-stitched sheets (booklet) to the sheet ejection tray TR2.

The image formation apparatus 1 may not include the post processing device, or may include a post processing device that is capable of other processing such as case binding, multi-hole punching, and creasing to form folding lines on a sheet besides the saddle stitching.

Here, the configuration of the image formation apparatus main body 100 is described with reference to FIG. 2. FIG. 2 shows an internal configuration of the image formation apparatus main body 100.

Figure 2:
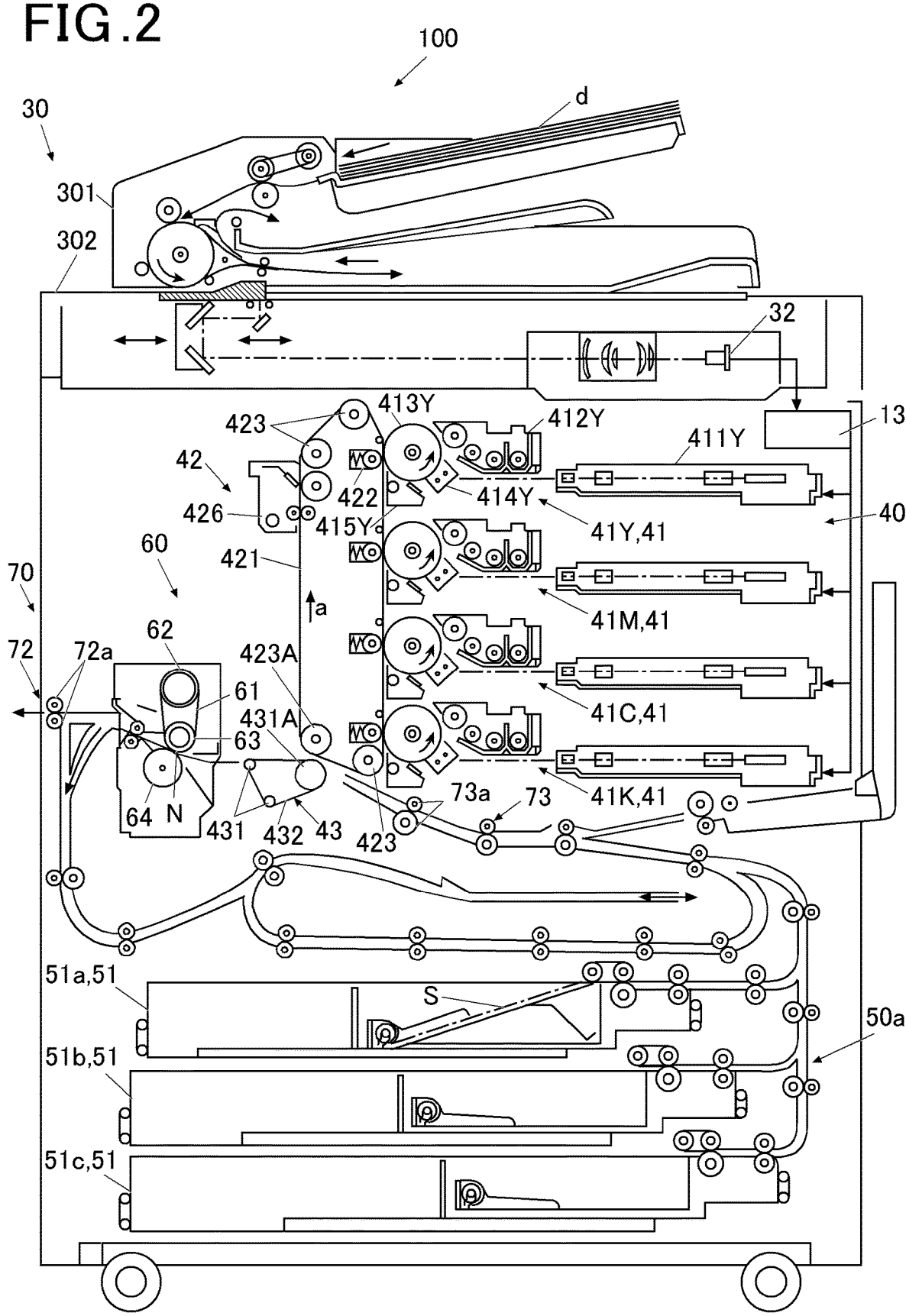
FIG. 2 shows an internal configuration of a main body of the image formation apparatus.

As shown in FIG. 2, the image forming unit 40 includes image forming sections 41Y, 41M, 41C, and 41K which form images of respective colors of Y, M, C, and K under the control of an image control CPU (central processing unit) 11 (hardware processor). Those are configured in the same way except for the toners stored therein, and therefore the alphabets indicating the colors may be omitted thereafter. The image forming unit 40 further includes an intermediate transfer unit 42 and a secondary transfer unit 43.

The image forming section 41 includes an exposure unit 411, a development unit 412, a photosensitive drum 413, a charging unit 414, and a drum cleaning unit 415. The photosensitive drum 413 is a negatively charged photoreceptor, for example. The surface of the photosensitive drum 413 includes photoconductive properties. The charging unit 414 is a corona charger, for example. The charging unit 414 may be a contact charging device that charges the contact charging member such as a charge roller, a charge brush, and a charge blade in contact with the photosensitive drum 413. The exposure unit 411 includes a laser diode (LD) 411a (see FIG. 3) that outputs a laser light as a light source, and a light deflector (polygon motor) that emits a laser light according to the image to be formed to the photosensitive drum 413.

The development unit 412 is a two-component development device. The development unit 412 includes a developer container storing the two-component developer, a development roller (magnetic roller) disposed rotatably at the opening of the developer container, a partition that divides the developer container so that two components can communicate, a conveyance roller for conveying the two-component developer on the opening side in the developer container to the development roller, and an agitation roller for agitating the two-component developer in the developer container. The toner as the two-component developer is stored in the above-described developer container.

The intermediate transfer unit 42 includes a primary transfer roller 422 that presses the intermediate transfer belt 421 against the photosensitive drum 413, support rollers 423 including a secondary transfer roller Up (backup roller) 423A, and a belt cleaning unit 426. The intermediate transfer belt 421 is extended around the support rollers 423 to be a loop. As at least one drive roller among the support rollers 423 rotates, the intermediate transfer belt 421 runs in a direction of the arrow a at a constant speed.

The secondary transfer roller 43 includes support rollers 431 including an endless secondary transfer belt 432 and a secondary transfer roller Lw 431A. The secondary transfer belt 432 is extended around the secondary transfer roller Lw 431A and the support rollers 431 to be a loop.

The fixing unit 60 heats and presses the sheet on which the toner image is formed by the image forming unit 40 under the control of the image control CPU 11 described later. The fixing unit 60 includes an endless fixing belt 61 as a heating member, a heating roller 62, a fixing roller 63 facing a pressing roller 64, and the pressing roller 64. The fixing belt 61 is extended around the heating roller 62 and the fixing roller 63. The heating roller 62 includes a heating means such as a halogen heater (not shown in the drawings) that heats the fixing belt 61. The fixing roller 63 forms a nip part N between the fixing belt 61 and the pressure roller 64.

In the above-described configuration, as the pressure roller 64 is rotated counterclockwise by a driving means not shown in the drawings, the fixing belt 61, the heating roller 62, and the fixing roller 63 are rotated clockwise. The fixing belt 61 is heated by the heating roller 62 in contact with the fixing belt 61, and the fixing roller 63 is also heated. The sheet on which the toner image is formed passes through the nip part N to be heated and pressed, and the toner image transferred onto the sheet is melted and fixed.

The image formation apparatus main body 100 further includes a scanning unit 30, a reading processing unit 13, the sheet feeding unit 50, and a sheet conveyer 70. The scanning unit 30 includes a sheet feeding device 301 and a scanner 302. The scanning unit 30 feeds a document d by the sheet feeding device 301, scans the document d with a CCD (charge coupled device) sensor 32 of the scanner 302, and thereby obtains input image data under the control of the image control CPU 11 described later. The sheet feeding unit 50 includes sheet feeders 50a and 50b. The sheet feeding unit 50 feeds a sheet S to the image forming unit 40 under the control of the image control CPU 11 described later. Three sheet feeding tray units 51a, 51b, and 51c of the sheet feeder 50a and an external sheet feeder 50b houses sheets S by predetermined type, the sheets being sorted according to the basis weight and/or the size.

The sheet conveyer 70 includes a sheet ejector 72 and a conveyance path section 73. The sheet conveyer 70 conveys the sheet S to the image forming unit 40 via the conveyance path section 73 and ejects the sheet S from the fixing unit 60 by the sheet ejector 72 according to the image control CPU 11 described later. The conveyance path section 73 includes multiple pairs of conveyance rollers such as a pair of registration rollers 73a. The sheet conveyer 70 includes a reversing path section that reverses a sheet on one side of which an image is formed and conveys the sheet to the image forming unit 40 again.

Next, the functional configuration of the image formation apparatus 1 is described with reference to FIG. 3. FIG. 3 is a block diagram showing the functional configuration of the image formation apparatus 1.

The image formation apparatus main body 100 includes a main body 100a and a print controller 100b, and forms a colored image by the electrophotographic method based on image data obtained by reading an image on a document with the scanning unit 30, image data received from the external device 2, or image data generated by the print controller 100b. The image data received from the external device 2 and the image data generated by the print controller 100b are RIP images. The image formation apparatus main body 100 is connected with the external device 2 on the network so as to send and receive information to and from each other via the LAN IF (local area network interface) 82 of the print controller 100b.

The main body 100a includes a main body controller 10, the operation/display interface 20, the scanning unit 30, and the image forming unit 40.

The main body controller 10 includes the image control CPU 11, a non-volatile memory 12, the reading processing unit 13, a compression IC (integrated circuit) 14, a DRAM (dynamic random access memory) control IC 15, an image memory 16, an decompression IC 17, and a writing processing unit 18.

The image control CPU 11 reads out various programs stored in the non-volatile memory 12 or the like, loads them to the RAM (not shown in the drawings), executes various kinds of processing in cooperation with the loaded programs, and thereby controls the components of the image formation apparatus 1 according to operation signals output from the operation/display interface 20. The functions of the image control CPU 11 are described later in detail.

The non-volatile memory 12 is composed of a non-volatile semiconductor memory that can read and write data or the like, and stores various programs and data concerning the image formation apparatus 1.

The reading processing unit 13 performs analog processing, shading processing, analog to digital conversion processing, and the like on the analog image signals output from the scanning unit 30 (CCD sensor 32) to generate digital image data. The reading processing unit 13 outputs the generated data to the compression IC 14. The compression IC 14 performs compression processing on the image data output from the reading processing unit 13, and then outputs the image data to the DRAM control IC 15.

The DRAM control IC 15 controls the compression processing of the image data by the compression IC 14 and the decompression processing of the compressed image data by the decompression IC 17 and performs input/output control of the image data to/from the image memory 16, under the control of the image control CPU 11. For example, when a command to store the image data read by the scanning unit 30 the DRAM control IC 15 is given, the DRAM control IC 15 causes the compression IC 14 to perform compression processing of the image data output from the reading processing unit 13 and store the compressed image data in the compression memory 16a of the image memory 16, When a command to print out the compressed image data stored in the compression memory 16a is given, the DRAM control IC 15 reads out the compressed image data from the compression memory 16a, causes the decompression IC 17 to perform decompression processing and store the data in the page memory 16b. The DRAM control IC 15 reads out the uncompressed image data from the page memory 16*b* and outputs the data to the reading processing unit 18.

The image memory 16 is composed of a DRAM, and includes the compression memory 16*a* and the page memory 16*b*. The compression memory 16*a* stores the compressed image data. The page memory 16*b* temporarily stores the uncompressed image data to be printed before image formation.

The decompression IC 17 performs decompression processing of the compressed image data read out from the compression memory 16*a*, and then outputs the image data to the DRAM control IC 15. The writing processing unit 18 generates print image data for image formation based on the image data to be printed output from the DRAM control IC 15, and outputs the data to the image forming unit 40.

The operation/display interface 20 includes an operation/display controller 21 and an LCD (liquid crystal display) 22. The operation/display controller 21 performs display control of the LCD 22 according to the command from the image control CPU 11, and outputs the operation signal generated by pressing the operation keys or the touch panel not shown in the drawings to the image control CPU 11. The LCD 22 has a touch panel covering the LCD 22, and displays various setting screens, image statuses, operation states of the functions, and the like on the display according to the display signals output from the operation/display controller 21.

The scanning unit 30 includes a scanner controller 31 that drives and controls the CCD sensor 32 and the like and the CCD sensor 32. The scanning unit 30 scans the document face of the document d supplied onto the contact glass by the sheet feeding device 301 or placed on the platen glass with light exposure by the light source, receives the light reflected on the document face, and converts the received reflected light by the CCD sensor 32 photoelectrically to generate the analog image signals. The scanning unit 30 outputs the generated analog image signal to the reading processing unit 13.

The image forming unit 40 includes a printer controller 401 and components such as an exposure unit 411 having an LD 411*a*. The printer controller 401 controls the operations of the components in the image forming unit 40 according to the command from the image control CPU 11. For example, the printer controller 401 forms the image on the sheet based on the print image data output from the writing processing unit 18.

Figure 3:
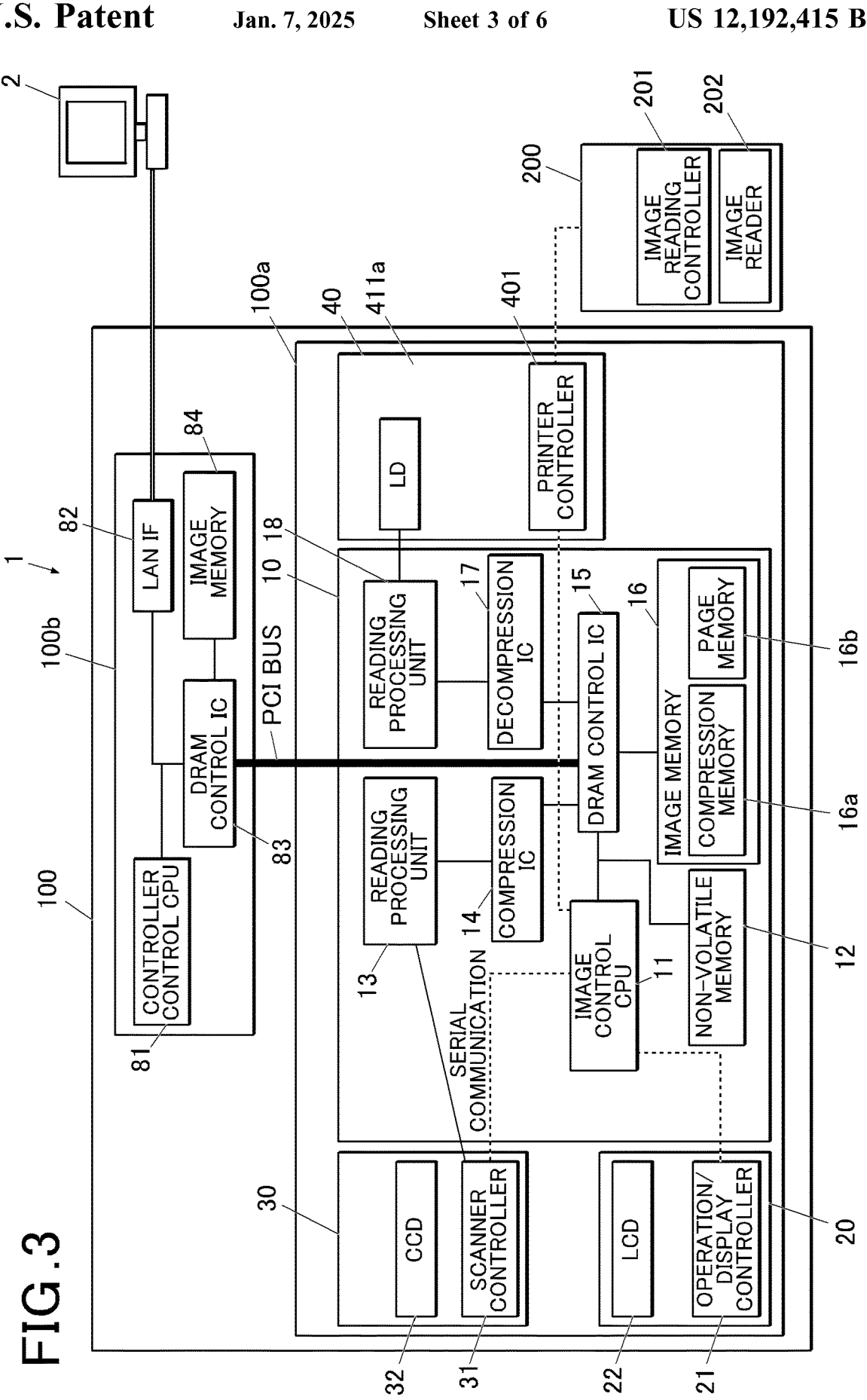
FIG. 3 is a block diagram showing a functional configuration of the image formation apparatus.

Though not shown in FIG. 3, the sheet feeding unit 50, the sheet feeding unit 50, the fixing unit 60, and the sheet conveyer 70 are connected to the image controller CPU 11. The sheet feeding unit 50, the fixing unit 60, and the sheet conveyer 70 feed a sheet S, heat and press the sheet S on which an image is formed, and convey the sheet S under the control of the image control CPU 11.

When the image formation apparatus 1 is used as a network printer, the print controller 100*b* manages and controls print jobs output from the external device 2 connected to the network to the image formation apparatus 1. The print controller 100*b* receives the data to be printed from the external device 2 and sends the data to the main body 100*a* as print job data. The print controller 100*b* includes a controller control CPU 81, a LAN IF 82, a DRAM control IC 83, and an image memory 84.

The controller control CPU 81 centrally controls the operations of the components of the print controller 100*b* and outputs the image data output from the external device 2 to the main body 100*a* as a print job via the LAN IF 82.

The LAN IF 82 is a network interface for connection with a LAN such as an NIC (network interface card) and a modem, and receives image data to be printed from the external device 2 via the network. The LAN IF 82 outputs the received image data to the DRAM control IC 83.

The DRAM control IC 83 controls storage in the image memory 84 of the image data received via the LAN IF 82, readout of the image data from the image memory 84, and the like. The DRAM control IC 83, which is connected to the DRAM control IC 15 of the main body controller 10 of the main body 100*a* and a PCI (peripheral components interconnect) bus, reads out the image data to be printed from the image memory 84, and outputs it to the DRAM control IC 15 according to the command from the controller control CPU 81.

The image memory 84 is composed of a DRAM, and temporarily stores the input image data.

The external device 2 generates data of a print job by a user operation and sends it to the image formation apparatus 1 via the network. A PC (personal computer), a server device, a mobile device such as a tablet PC, or the like may be used as the external device 2.

The image reading device 200 includes an image reading controller 201 and an image reader 202. The image reading controller 201 centrally controls the operations of the components of the image reading device 200, and outputs the read image data generated by reading by the image reader 202 to the image control CPU 11 via the printer controller 401.

The image reader 202 includes the image readers 202A and 202B. The image reader 202 reads the image on the sheet S on which the image is formed by the image forming unit 40 and fixed by the fixing unit 60 and outputs the read image data to the image reading controller 201.

Next, the functions of the image control CPU 11 are described.

The image control CPU 11 obtains the read image data from the image reading device 200. Here, the image control CPU 11 functions as an obtainer.

The image control CPU 11 stores read image data which is generated by reading the image formed on the sheet in a proof output by the image reader 202 as first correct image data (Scan image data) in the non-volatile memory 12. Here, the image control CPU 11 functions as a first correct image setting unit.

The image control CPU 11 stores input image (RIP image) data as second correct image data (RIP image data) in the non-volatile memory 12. Here, the image control CPU 11 functions as a second correct image setting unit.

The image control CPU 11 determines which one of the first correct image data and the second correct image data is used for an image check. Here, the image control CPU 11 functions as a determiner.

The image control CPU 11 compares the read image data obtained by the obtainer with the first correct image data or the second correct image data determined as the correct image data for an image check. Here, the image control CPU 11 functions as an image checker.

The image control CPU 11 receives the user setting regarding whether the determination is valid or invalid. If the determination is invalid, the image controller 11 receives the user setting regarding which one of the first correct image data and the second correct image data is used for the image check. Here, the image control CPU 11 functions as a receiver.

The image control CPU 11 functions as the image control apparatus 1000.

Though not shown in FIG. 3, the post processing device FN may be connected to the image control CPU 11 via the image reading controller 201. The post processing device FN performs post processing such as saddle stitching on the sheet S input from the image reading device 200 and ejects the sheet S, under the control of the image control CPU 11.

[Operations of Image Formation Apparatus 1]

Next, the actions of a printing check process in this embodiment are described.

Figure 4A:
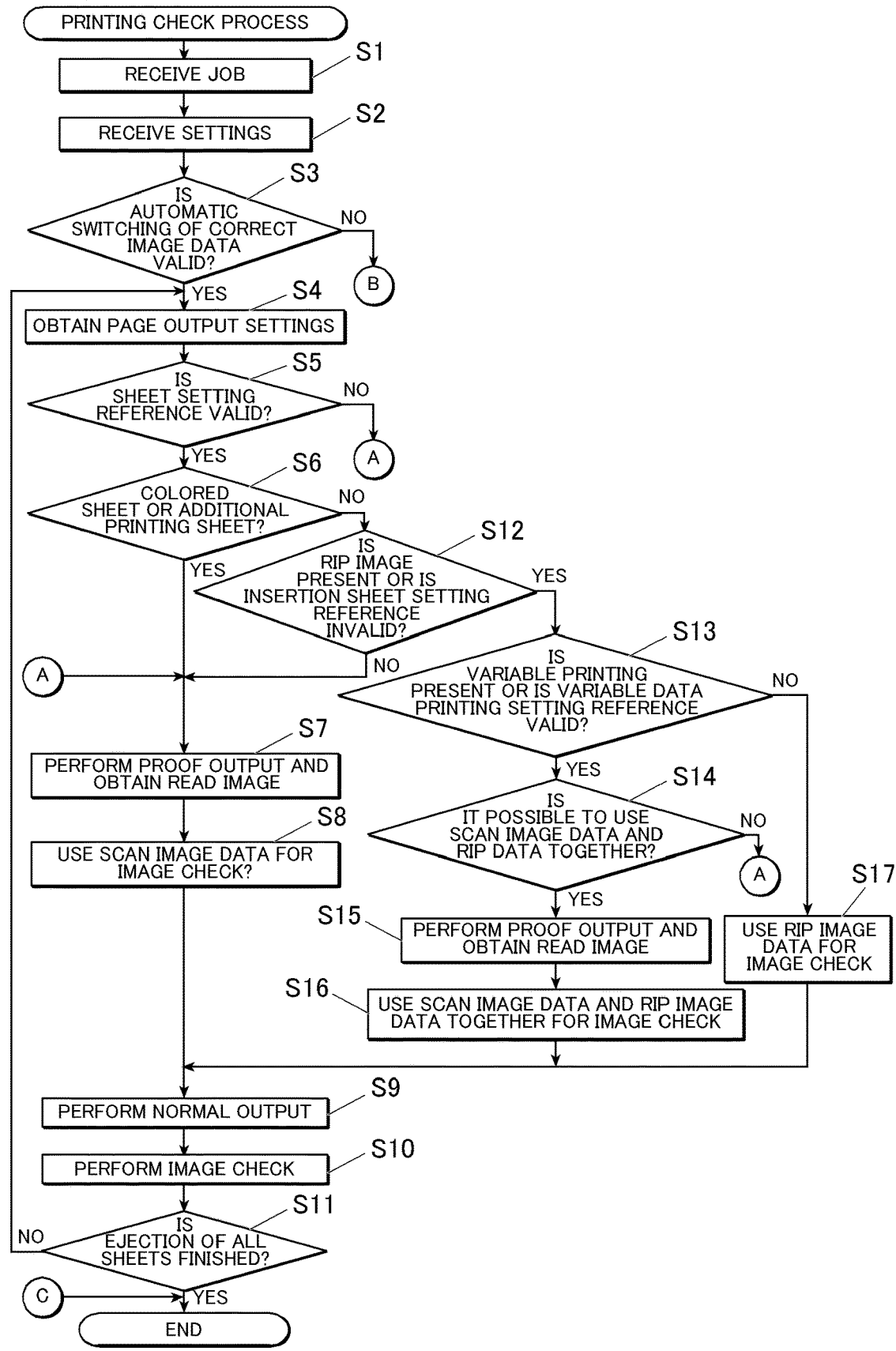
FIG. 4A is a flowchart showing a printing check process in the embodiment of the present invention.
Figure 4B:
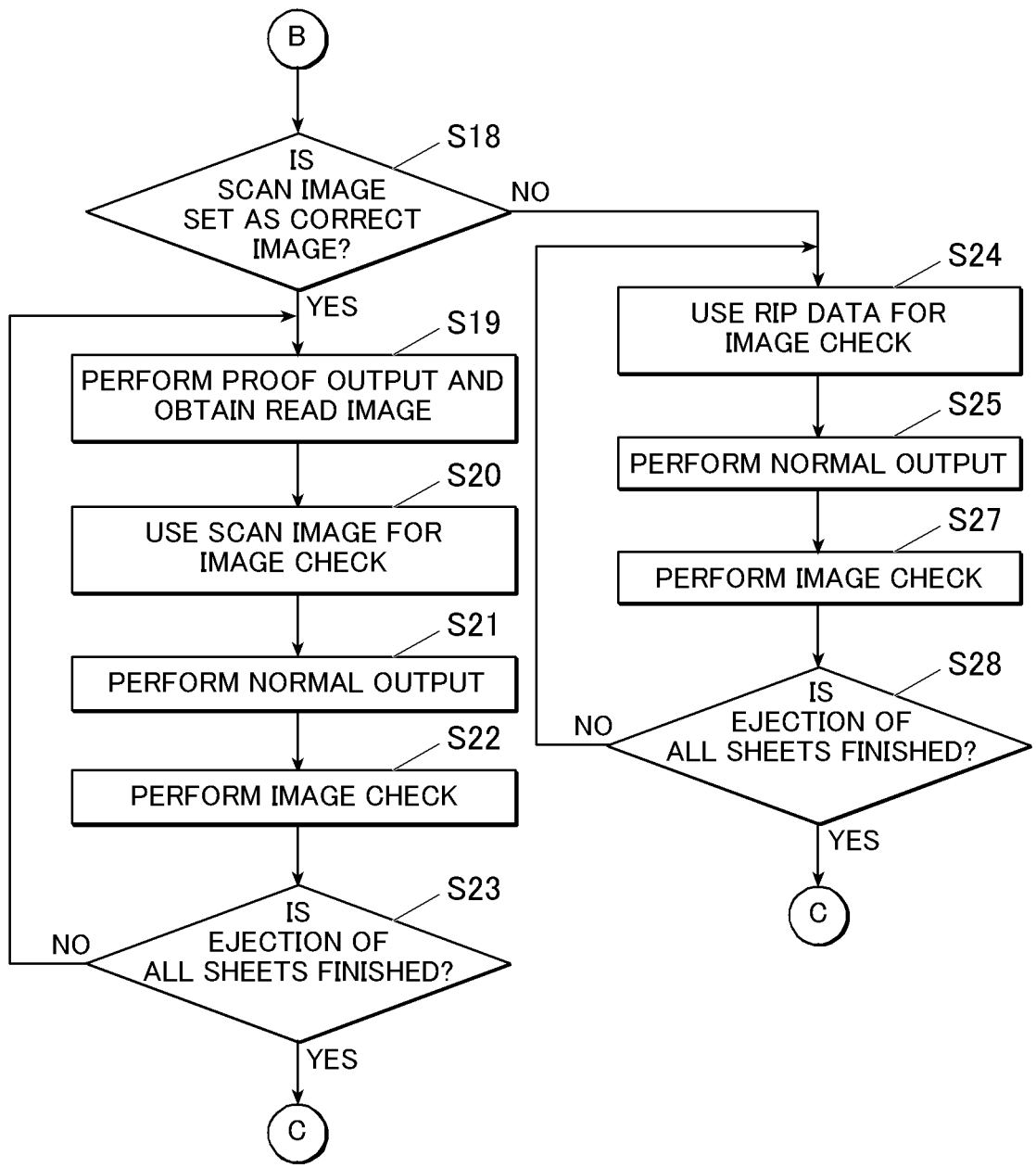
FIG. 4B is a flowchart showing a printing check process in the embodiment of the present invention.

FIGS. 4A and 4B are flowcharts of the printing check process performed in the image formation apparatus 1. The printing check process is performed by the cooperation of the image control CPU 11 and the program(s) stored in the non-volatile memory 12.

The setting of a job subject to a print check includes the page output setting for each page. The page output setting includes a sheet setting, a sheet insertion setting, a variable data printing setting. In the sheet setting, the type of sheet such as a sheet for additional printing or a colored sheet is set. In the sheet insertion setting, insertion of a blank sheet(s) where there is no RIP image data is set. In the variable data printing setting, whether a print job has an area where different images are printed on different pages is set.

First, the image control CPU 11 receives a job input from the operation/display interface 20 or receives a job from the print controller 100b (Step S1).

Figure 5:
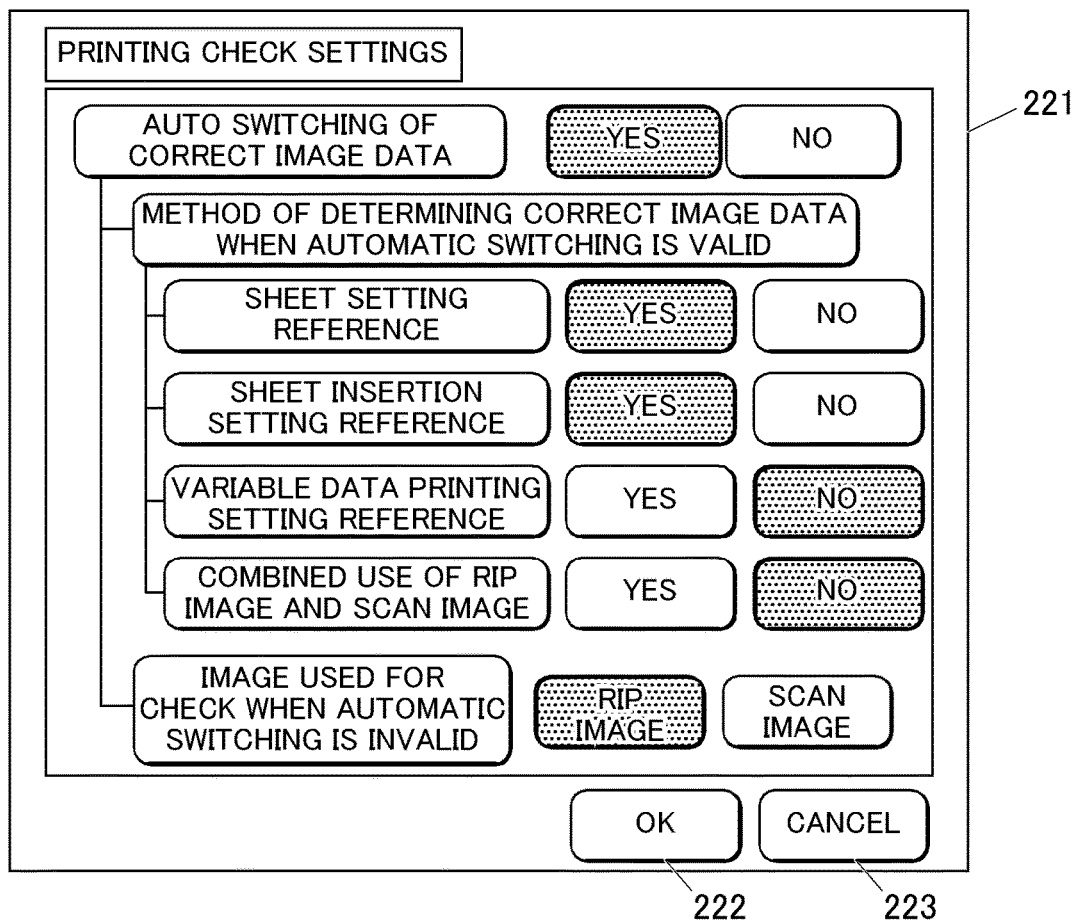
FIG. 5 shows an example of a screen of printing check setting in the embodiment of the present invention.

Next, the image control CPU 11 displays a print check setting screen 221 shown in FIG. 5 on the LCD 22, and receives various settings from the user via the operation/display interface 20 (Step S2).

As shown in FIG. 5, the followings can be set on the printing check setting screen 221: the setting of validity/invalidity of automatic switching of the Scan image data and the RIP image data which are used as the correct image data for printing check; the setting of the method of determining the correct image data when the automatic switching is valid; and the setting of the correct image data for printing check when the automatic switching is invalid. Regarding the setting of the method of determining the correct image data when the automatic switching is valid, the followings can be set: validity/invalidity of the sheet setting reference; validity/invalidity of the sheet insertion setting reference; validity/invalidity of the variable data setting reference; and validity/invalidity of the combined use of the Scan image data and RIP image data within one page.

When the confirmation button 222 on the printing check setting screen 221 is pressed, the image control CPU 11 proceeds to Step S3, and when the cancel button 223 is pressed, the settings on the printing check setting screen 221 are initialized.

At Step S3, the image control CPU 11 determines whether the setting of the automatic switching of the correct image data for printing check received at Step S2 is valid (Step S3). If the setting of the automatic switching of the correct image data is valid (Step S3; YES), the image control CPU 11 obtains the page output setting of a page of a job received at Step S1 (Step S4).

Next, the image control CPU 11 determines whether the sheet setting reference is valid in the various settings received at Step S2 (Step S5). If the sheet setting reference is valid (Step S5; YES), the image control CPU 11 determines whether a sheet for additional printing or a colored sheet is set in the page output setting received at Step S4 (Step S6).

If a sheet for additional printing or a colored sheet is set as a print sheet (Step S6; YES), the image control CPU 11 controls the image forming unit 40 and performs a proof output. The user looks over the proof output result, and if the user determines that the result is fine, the user commands reading of the fine output via the operation/display interface 20. When the command of image reading is received, the image control CPU 11 controls the image reader 202 and obtains the read image data (Step S7).

Next, the image control CPU 11 stores the read image data obtained at Step S7 as the Scan image data (the first correct image data) in the non-volatile memory 12, and determines that the Scan image data is to be used in the image check performed later (Step S8).

Next, the image control CPU 11 controls the image forming unit 40 and performs a normal (actual) output (Step S9).

Next, the image control CPU 11 controls the image reader 202, reads the sheet in the normal output at Step S9, and obtains the read image data in the normal output. The image control CPU 11 compares the read image data in the normal output with the Scan image data stored at Step S8 and determines whether the data matches each other in a predetermined allowable range. If it is determined that the data matches each other, the image control CPU 11 determines that the normal output is fine and ejects the sheet to the sheet ejection tray TR1, and if it is determined that the data do not match each other, the image control CPU 11 determines that the normal output is not fine and ejects the sheet to the sheet ejection tray TR3 (Step S10).

Next, the image control CPU 11 determines whether ejection of all the pages of the received job is completed (Step S11). If the ejection is not completed (Step S11; YES), the image control CPU 11 proceeds to Step S4, and starts the processing for the next page. If it is completed (Step S11; YES), the image control CPU 11 ends the printing check process.

If a sheet for additional printing or a colored sheet is set as a print sheet in the page output setting (Step S6; NO), the image control CPU 11 determines whether the RIP image as the image for printing input from the print controller 100b is present or whether the sheet insertion setting reference is invalid in the various settings received at Step S2 (Step S12). If the RIP image is not present or the sheet insertion setting reference is valid (Step S12; NO), the image control CPU 11 proceeds to Step S7.

If the RIP image is present and the sheet insertion setting reference is invalid (Step S12; YES), the image control CPU 11 determines whether the job has an area where different images are printed on different pages as variable data printing or whether the variable data printing setting reference is valid in the various settings received at Step S2 (Step S13). If the print job involves variable data printing or the variable data printing setting reference is valid (Step S13; YES), the image control CPU 11 determines whether the combined use of the Scan image data and the RIP data is valid as the correct image data on one page in the various settings received at Step S2 (Step S14).

If the combined use of the Scan image data or the RIP image data is valid (Step S14; YES), the image control CPU 11 performs Step S15 similar to Step S7 and obtains the read image data.

Next, the image control CPU 11 stores the read image data obtained at Step S15 as the Scan image data (the first correct image data) in the non-volatile memory 12, and stores the RIP image data (the second correct image data) similarly in the non-volatile memory 12. The image control CPU 11 then determines that the Scan image data is to be used for the image check performed at Step S10 in the area where different images are printed on different pages and the RIP image data is to be used in the area where the same image is printed on different pages for comparison (Step S16), and proceeds to Step S9.

If the combined use of the scan image data and the RIP image data is invalid (Step S14; NO), the image control CPU 11 proceeds to Step S7.

If the print job does not involve the variable data printing and the variable data printing setting reference is invalid (Step S13; NO), the image control CPU 11 stores the RIP image data in the non-volatile memory 12. The image control CPU 11 determines that the RIP image data is to be used for the image check performed at Step S10 (Step S17), and proceeds to Step S9.

If the sheet setting reference is invalid (Step S5; NO), the image control CPU 11 proceeds to Step S7.

If the automatic switching setting of the correct image data is invalid (Step S3; NO), the image control CPU 11 determines whether the image data used for the image check when the automatic switching setting is invalid is the Scan image data (Step S18). If the image data used for the image check is the Scan image data (Step S18; YES), the image control CPU 11 performs Steps 19 to 23 similar to Steps S7 to S11. If ejection of all the pages is not completed (Step S23; NO), the image control CPU 11 proceeds to Step S19 and starts the processing of the next page. If ejection is completed (Step S23; YES), the image control CPU 11 ends the printing check process.

If the image data used for the image check is not the Scan image data but the RIP image data (Step S18; NO), the image control CPU 11 performs Steps S24 to S28 similar to Steps S17, S9 to S11. If ejection of all the pages is not completed (Step S28; NO), the image control CPU 11 proceeds to Step S24 and starts the processing for the next page. If ejection of all the pages is completed (Step S28; YES), the image control CPU 11 ends the printing check process.

Figure 6:
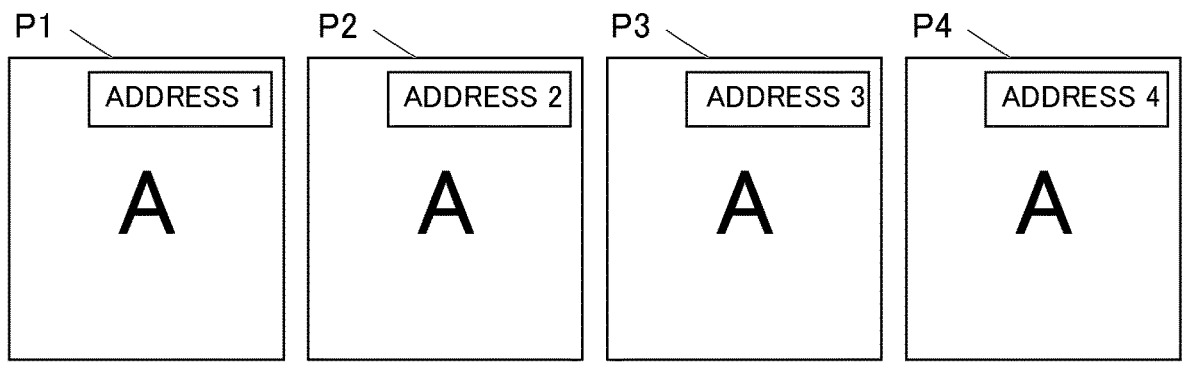
FIG. 6 shows an example of variable data printing in the embodiment of the present invention.

FIG. 6 shows an example of an image check in the case where the print job has an area where different images are printed on different pages (variable data printing). In that case, the area where different images are printed on different pages is the address area, and the area where the same image is printed on different pages is the area other than the address area.

As described hereinbefore, the image control apparatus 1000 includes: the obtainer (the image control CPU 11) that obtains read image data generated by reading an image formed on a sheet, the first correct image setting unit (the image control CPU 11) that sets read proof image data generated by reading a proof image formed on a sheet in a proof output as first correct image data; the second correct image setting unit (the image control CPU 11) that sets input image data as second correct image data; the determiner (the image control CPU 11) that determines which one of the first correct image data and the second correct image data is used as correct image data in an image check for each page; and the image checker (the image control CPU 11) that performs the image check by comparing the read image data obtained by the obtainer with the first correct image data or the second correct image data determined as the correct image data by the determiner.

Therefore, it is possible to perform an efficient image check.

In the image control apparatus 1000, the determiner (the image control CPU 11) determines the correct image data according to a setting of a print job. Therefore, it is possible to perform an efficient image check according to the job settings.

In the image control apparatus 1000, the determiner (the image control CPU 11) determines the correct image data according to a sheet setting. Therefore, it is possible to perform an efficient image check according to the sheet setting.

In the image control apparatus 1000, in response to the sheet setting in which a sheet for additional printing or a colored sheet is set, the determiner (the image control CPU 11) determines that the first correct image data is used in the image check. Therefore, it is possible to perform an efficient image check according to the sheet setting.

In the image control apparatus 1000, in response to the sheet setting in which a sheet for additional printing or a colored sheet is not set and in presence of the input image data (RIP image), the determiner (the image control CPU 11) determines that the second correct image data is used in the image check. Therefore, it is possible to perform an efficient image check according to the sheet setting.

In the image control apparatus 1000, in absence of the input image data (RIP image), the determiner (the image control CPU 11) determines that the first correct image data is used in the image check. Therefore, it is possible to easily perform an efficient image check even when the RIP image does not exist.

In the image control apparatus 1000, in response to a setting in which an output involves variable data printing, the determiner (the image control CPU 11) determines that the first correct image data is used in the image check. Therefore, it is possible to do an efficient image check according to the output setting.

In the image control apparatus 1000, a receiver (the image control CPU 11) receives a setting about whether a determination of the correct image data by the determiner (the image control CPU 11) is valid or invalid, and upon receipt of the setting in which the determination by the determiner is invalid, the receiver receives a user setting that specifies which one of the first correct image data and the second correct image data is used in the image check. Therefore, it is possible to perform an efficient image check as the user likes.

As described hereinbefore, the image control apparatus 1000 includes: the obtainer (the image control CPU 11) that obtains read image data generated by reading an image formed on a sheet, the first correct image setting unit (the image control CPU 11) that sets read proof image data generated by reading a proof image formed on a sheet in a proof output as first correct image data; the second correct image setting unit (the image control CPU 11) that sets input image data as second correct image data; and the image checker (the image control CPU 11) that performs an image check in variable data printing by comparing the read image data obtained by the obtainer in a first area of the read image data where different images are printed on different pages with the first correct image data and by comparing the read image data obtained by the obtainer with the second correct image data in a second area of the read image data outside the first area.

Therefore, it is possible to perform an efficient image check because it is necessary just to determine appropriateness of the proof output in an area where different images are printed on different pages.

The above description for the embodiments merely illustrate suitable examples of the image formation apparatus according to the present invention, and the present invention is not limited thereto.

The image control apparatus 1000 is provided inside the image formation apparatus 1 in the above-described embodiment, but the present invention is not limited thereto. The image control apparatus may be a device provided separately from the image formation apparatus.

In the above-described embodiment, the proof output is performed only when the Scan image data is used for the image check, but the present invention is not limited thereto. The proof output may be performed in the case where the RIP image data is used for the image check.

In the above-described embodiment, the Scan image data and the RIP image data are used together for the image check in the variable data printing having an area where different images are printed on different pages, but the present invention is not limited thereto. The Scan image data and the RIP image data may be used together in a case where the area where different images are printed is smaller than a predetermined value.

In the above-described embodiment, the Scan image data and the RIP image data are used together in the variable data printing, but the present invention is not limited thereto. The Scan image data may be used for the image check in the variable data printing.

In the above-described embodiment, the correct image data is set for each page in the printing check process so that the normal output is performed and the image check is done, but the present invention is limited thereto. After the correct image data is set for all the pages, the normal output of all the pages may be performed collectively and then the image check of all the pages may be done.

In the above-described embodiment, the read image data generated by reading by the image reader 202 is used for the image check, but the present invention is limited thereto. Read image data generated by reading by an external reading device may be received and used for the image check.

As for the other detailed configurations and detailed operations of the image formation apparatus, modifications can be made as needed within the scope of the present invention.

What is claimed is:

1. An image control apparatus comprising:
a hardware processor,
wherein the hardware processor is configured to perform a printing check process for a job comprising a plurality of pages by:
obtaining read image data generated by reading an image formed on a sheet;
setting read proof image data generated by reading a proof image formed on a sheet in a proof output as first correct image data;
setting input image data as second correct image data; and
performing an image check in variable data printing by comparing the read image data obtained by the hardware processor with the first correct image data in a first area of the read image data where different images are printed on different pages and by comparing the read image data obtained by the hardware processor with the second correct image data in a second area of the read image data outside the first area.

2. The image control apparatus according to claim 1, wherein the hardware processor determines the correct image data according to a setting of a print job.

3. The image control apparatus according to claim 2, wherein the hardware processor determines the correct image data according to a sheet setting.

4. The image control apparatus according to claim 3, wherein in response to the sheet setting in which a sheet for additional printing or a colored sheet is set, the hardware processor determines that the first correct image data is used in the image check.

5. The image control apparatus according to claim 3, wherein in response to the sheet setting in which a sheet for additional printing or a colored sheet is not set and in presence of the input image data, the hardware processor determines that the second correct image data is used in the image check.

6. The image control apparatus according to claim 1, wherein in absence of the input image data, the hardware processor determines that the first correct image data is used in the image check.

7. The image control apparatus according to claim 1, wherein in response to a setting in which an output involves variable data printing, the hardware processor determines that the first correct image data is used in the image check.

8. The image control apparatus according to claim 1, wherein the hardware processor receives a setting about whether a determination of the correct image data by the hardware processor is valid or invalid,
wherein, upon receipt of the setting in which the determination by the hardware processor is invalid, the hardware processor receives a user setting that specifies which one of the first correct image data and the second.

9. An image formation apparatus comprising:
an image former that forms an image on a sheet;
an image reading device that reads an image formed on a sheet so as to generate read image data; and
the image control apparatus according to claim 1.

10. The image control apparatus according to claim 1, wherein the automatically determining which one of the first correct image data and the second correct image data is used as correct image data in an image check for each page of the job is based on page output settings for each page of the print job.

11. A non-transitory storage medium storing a computer-readable program that causes a computer of an image control apparatus to perform a printing check process for a job comprising a plurality of pages by:
obtaining read image data generated by reading an image formed on a sheet;
setting read proof image data generated by reading a proof image formed on a sheet in a proof output as first correct image data;
setting input image data as second correct image data; and
performing an image check in variable data printing by comparing the read image data obtained by the computer with the first correct image data in a first area of the read image data where different images are printed on different pages and by comparing the read image data obtained by the computer with the second correct image data in a second area of the read image data outside the first area.

12. The non-transitory storage medium according to claim 11, wherein the automatically determining which one of the first correct image data and the second correct image data is used as correct image data in an image check for each page of the job is based on page output settings for each page of the print job.

* * * * *